United States Patent
Wooley et al.

(10) Patent No.: US 9,094,608 B1
(45) Date of Patent: Jul. 28, 2015

(54) VIRTUAL DIRECTOR'S VIEWFINDER

(75) Inventors: Kevin Wooley, San Francisco, CA (US); Spencer Reynolds, San Francisco, CA (US); Michael Sanders, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 806 days.

(21) Appl. No.: 12/982,502

(22) Filed: Dec. 30, 2010

Related U.S. Application Data

(60) Provisional application No. 61/365,610, filed on Jul. 19, 2010.

(51) Int. Cl.
*H04N 5/232* (2006.01)
*G03B 17/18* (2006.01)

(52) U.S. Cl.
CPC ............ *H04N 5/23293* (2013.01); *G03B 17/18* (2013.01)

(58) Field of Classification Search
CPC ....................................................... G03B 17/18
See application file for complete search history.

(56) References Cited

U.S. PATENT DOCUMENTS

2001/0043279 A1* 11/2001 Niikawa et al. ............... 348/335
2008/0316368 A1* 12/2008 Fritsch et al. ................. 348/722

OTHER PUBLICATIONS

"DV101: More iApps for This & That" [online] Digital Video, 2009 [retrieved on Jun. 8, 2010]. Retrieved from the Internet: <URL: http://www.dv.com/article/89884>.

"The Mark Vb: Director's Viewfinder" [online]. Alan Gordon Enterprises, 2007 [retrieved on Jun. 8, 2010]. Retrieved from the Internet: <URL: http://www. alangordon.com/s_camaccessories_markvb.html>.

"New iPhone App for Directors and Cinematographers—Artemis" desdemona's posterous, 2009 [retrieved on Jun. 8, 2010]. Retrieved from the Internet: <URL:http://desdemona.posterous.com/new-iphone-app-for-directors-and-cinematograp>.

"Looking Through a Director's Viewfinder" [online]. Filmcastlive, 2008 [retrieved on Jun. 8, 2010]. Retrieved from the Internet: <URL: http://filmcastentertainment.blogspot.com/2009/07/looking-through-directors-viewfinder.html>.

"Accessories" [online] Cinoptix, 2009 [retrieved on Jun. 8, 2010]. Retrieved from the Internet: <URL: http://www. cinoptix.com.au/accessories/index.html>.

"Cavision VFM-11X Micro Director's Viewfinder, 11x Zoom" [online] Power Reviews, Inc. 2008 [retrieved on Jun. 8, 2010]. Retrieved from the Internet: <URL: http://www.buzzillions.com/reviews/cavision-vfm-11x-micro-directors-viewfinder-zoom-reviews>.

* cited by examiner

*Primary Examiner* — Joseph Ustaris
*Assistant Examiner* — Mikhail Itskovich
(74) *Attorney, Agent, or Firm* — Kilpatrick Townsend & Stockton LLP

(57) ABSTRACT

A virtual director's viewfinder includes: a housing with a form factor of a director's viewfinder; at least one mechanical viewfinder control connected to the housing, the virtual director's viewfinder encoding a setting of the mechanical viewfinder control into digital setting information; at least one communication device for communication of the digital setting information to a computer system, and for receiving from the computer system an image generated using the digital setting information; and a display device that presents at least the image received from the computer system.

14 Claims, 3 Drawing Sheets

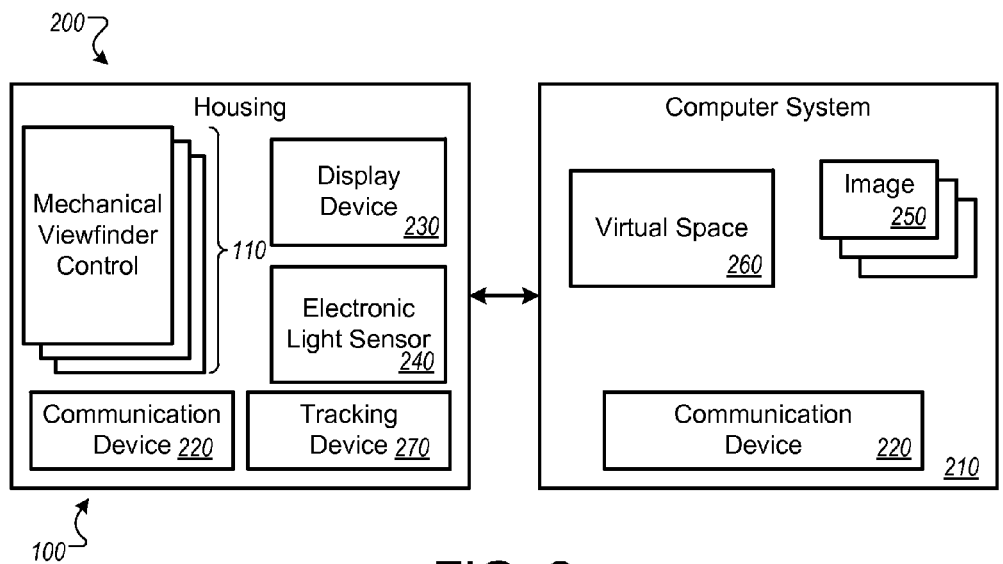
FIG. 2
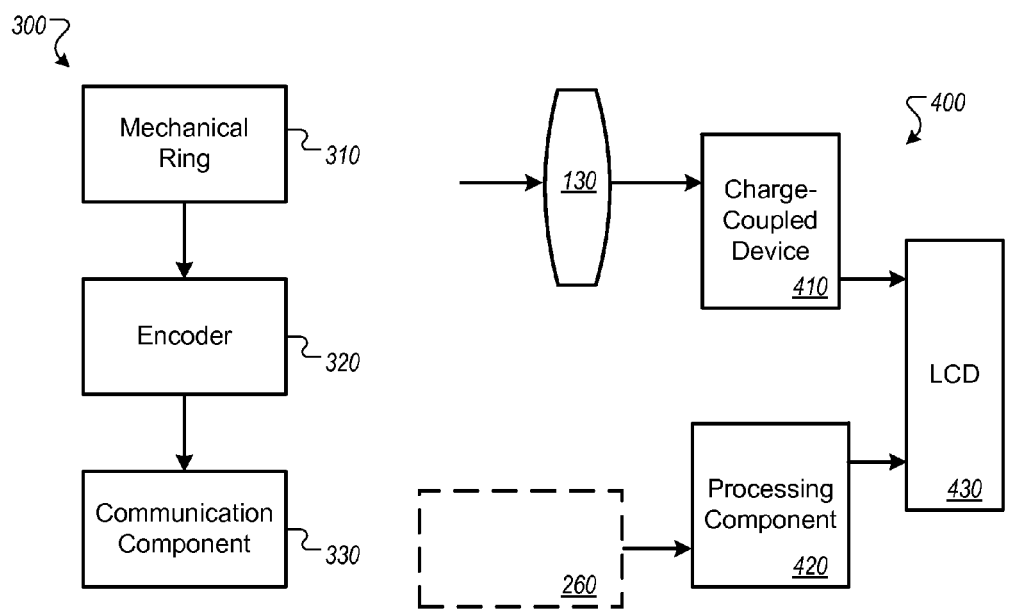
FIG. 3
FIG. 4

VIRTUAL DIRECTOR'S VIEWFINDER

CROSS-REFERENCE TO RELATED APPLICATION

This application claims priority from U.S. Provisional Application Ser. No. 61/365,610, filed Jul. 19, 2010, and entitled "Virtual Director's Viewfinder," the entire contents of which are incorporated herein by reference.

TECHNICAL FIELD

This document relates to a virtual director's viewfinder.

BACKGROUND

For most of the history of cinematography, motion pictures were shot in physical sets, such as in outdoor locations or on specially prepared movie stages. The cameras used for such footage included the conventional movie cameras that chemically registered image contents on celluloid film, as well as modern cameras that use discs or other re-recordable digital media.

In such moviemaking sessions, the director sometimes uses a director's viewfinder as help in analyzing and evaluating how to best shoot a scene to accomplish the desired effect. Essentially, a director's viewfinder is an optical device that allows the director to view the scene as it would appear through the camera's lens. For example, this effect is accomplished by choosing the settings on the viewfinder according to those of the camera currently being evaluated. Thus, the director's viewfinder can give an early indication of whether the chosen lens, camera angle, aperture, zoom and/or aspect ratio will produce images that match the director's expectations.

SUMMARY

The invention relates to a virtual director's viewfinder.

This document describes devices, systems and techniques by which a user, such as a director or other filmmaker, in a convenient way can see images or video sequences generated from a virtual space. As described below, the user can employ a handheld physical device, sometimes referred to as a virtual director's viewfinder, to select or alternate between various camera settings, such as aperture, focal length and/or aspect ratio. The user can enter the settings using mechanical rings or other physical controls on the device. The setting information is forwarded to a computer system for use in generating one or more images from a virtual space. The system generates the image(s) according to the settings and returns the image(s) to the virtual director's viewfinder. There, the virtual director's viewfinder displays the generated image(s) to the user on a display device, which is for example mounted in a way that is analogous to the eyepiece on a traditional director's viewfinder.

In a first aspect, a virtual director's viewfinder includes: a housing with a form factor of a director's viewfinder; at least one mechanical viewfinder control connected to the housing, the virtual director's viewfinder encoding a setting of the mechanical viewfinder control into digital setting information; at least one communication device for communication of the digital setting information to a computer system, and for receiving from the computer system an image generated using the digital setting information; and a display device that presents at least the image received from the computer system.

Implementations can include any or all of the following features. The virtual mechanical viewfinder control comprises an aperture ring, the setting indicates an aperture size, the digital setting information comprises digital aperture size information corresponding to the aperture size, and wherein the image is generated according to the digital aperture size information. The mechanical viewfinder control comprises a zoom ring, the setting indicates a focal length, the digital setting information comprises digital focal length information corresponding to the focal length, and wherein the image is generated according to the digital focal length information. The mechanical viewfinder control comprises an aspect ratio ring, the setting indicates an aspect ratio, the digital setting information comprises digital aspect ratio information corresponding to the aspect ratio, and wherein the image is generated according to the digital aspect ratio information. The virtual director's viewfinder further includes: optics comprising at least one lens and mounted to the housing for capturing a physical-scene image; and an electronic light sensor mounted to the housing for registering the captured physical-scene image. The virtual director's viewfinder is configured to operate in each of multiple modes including at least: a virtual mode where the display device presents the image; and a physical mode where the display device presents the physical-scene image. The virtual director's viewfinder further includes a tracking device that performs motion capture of the virtual director's viewfinder, wherein the motion capture is used in generating the image. The communication device is configured to forward the physical-scene image to the computer system, and wherein the image from the computer system is generated by adding virtual-space content to the physical-scene image. The image is included in a video sequence output by the computer system and presented on the display device. The display device presents the image, the virtual director's viewfinder further comprising: another control configured for a user to cause the communication device to instruct the computer system to record a snapshot of at least the image, based on the user activating the control when the image is being presented.

In a second aspect, a system includes: a computer device having defined therein a virtual space; and a virtual director's viewfinder for communication with the computer device, the virtual director's viewfinder having a form factor of a director's viewfinder and including a display device that presents at least one image of the virtual space.

Implementations can include any or all of the following features. The virtual director's viewfinder further includes: at least one mechanical viewfinder control; and an encoder for encoding a setting of the mechanical control into digital setting information, the virtual director's viewfinder forwarding the digital setting information to the computer device; wherein the computer device generates the image using the digital setting information and forwards the image to the virtual director's viewfinder. The mechanical viewfinder control comprises at least one selected from: an aperture ring, wherein the setting indicates an aperture size; a zoom ring, wherein the setting indicates a focal length; and an aspect ratio ring, wherein the setting indicates an aspect ratio. The virtual director's viewfinder further includes: optics comprising at least one lens for capturing a physical-scene image; and an electronic light sensor for registering the captured physical-scene image. The display device presents the image when the virtual director's viewfinder operates in a virtual mode, and presents the physical-scene image when the virtual director's viewfinder operates in a physical mode. The virtual director's viewfinder forwards the physical-scene image to the computer device, and wherein the computer device adds virtual-space content to the physical-scene image to generate the image. The virtual space is three-dimensional and has a perspective that matches a physical scene where the physical-scene image is captured. The system further includes a tracking device that performs motion capture of the virtual director's viewfinder, wherein the motion capture is used in generating the image.

In a third aspect, a method includes: encoding a setting of a mechanical viewfinder control on a virtual director's viewfinder into digital setting information; forwarding the digital setting information from the virtual director's viewfinder to a computer system having defined therein a virtual space; and receiving, for display at the virtual director's viewfinder, an image of the virtual space that the computer system generates using the digital setting information.

Implementations can include any or all of the following features. The method further includes: receiving user input by another control at the virtual director's viewfinder when the image is being presented; and instructing the computer system, in response to the user input, to record a snapshot of at least the image. The method further includes: capturing a physical-scene image in the virtual director's viewfinder using an electronic light sensor and optics comprising at least one lens. The method further includes: forwarding the physical-scene image to the computer system, wherein the image is generated by the computer system adding virtual-space content to the physical-scene image.

Implementations provide any or all of the following advantages: A virtual viewfinder with mechanical controls, e.g., like those on a traditional viewfinder, for controlling a displayed virtual image. A computer device that generates a perspective of a virtual set and outputs images of the virtual set according to inputs from a virtual viewfinder. A method of generating an image of a virtual set by converting user-made settings on mechanical controls into information, forwarding the information to a computer system for use in generating a virtual image, and displaying the resulting virtual image on a viewfinder that has the mechanical controls.

The details of one or more implementations are set forth in the accompanying drawings and the description below. Other features and advantages will be apparent from the description and drawings, and from the claims.

DESCRIPTION OF DRAWINGS

FIG. 2 shows an example of a system including a virtual director's viewfinder.

FIG. 3 schematically shows an example of a mechanical viewfinder control.

FIG. 4 shows an example of components in a virtual director's viewfinder.

Like reference symbols in the various drawings indicate like elements.

DETAILED DESCRIPTION

Figure 1:
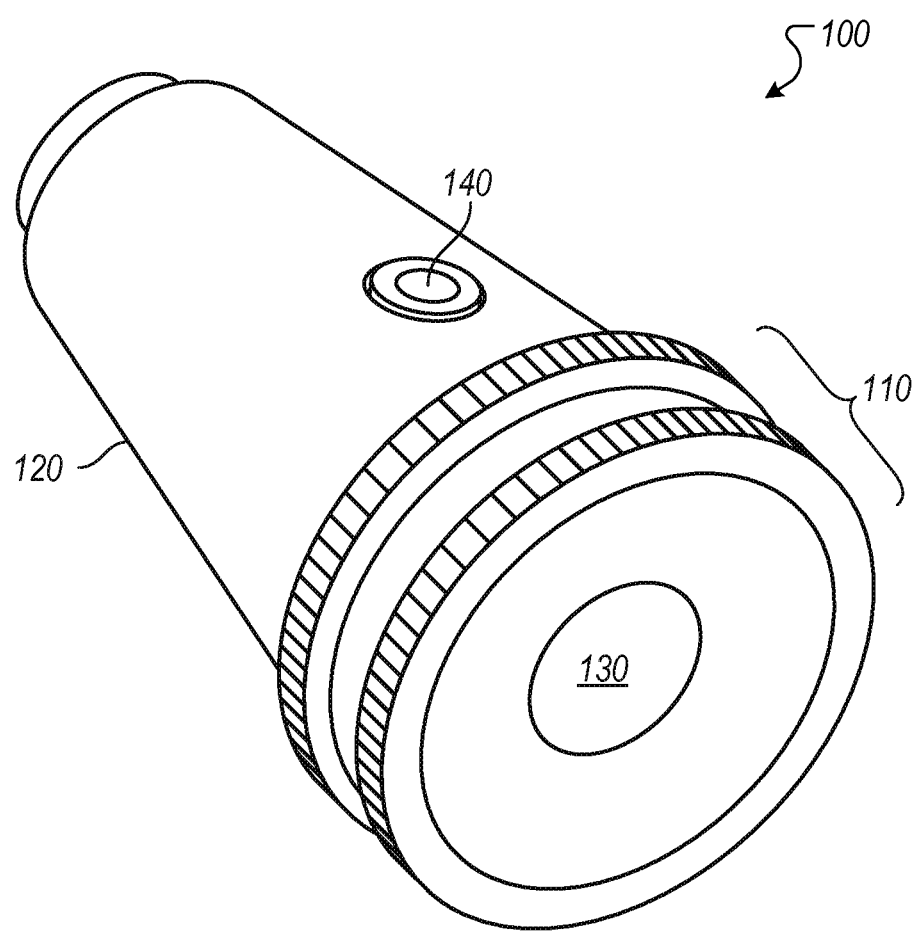
FIG. 1 shows an example of a virtual director's viewfinder.

FIG. 1 shows an example of a virtual director's viewfinder 100. In some implementations, a viewfinder for virtual cinematography looks similar or essentially identical to a traditional optical director's viewfinder, but displays a live virtual image instead. For example, the director manipulates the displayed virtual image with rings on the virtual viewfinder that operate like those on the traditional viewfinder. As another example, a combination between a virtual and a traditional viewfinder has a virtual mode for displaying the virtual image, and a physical mode for displaying an image of a physical set, with the rings functioning in both modes. Optionally, the virtual and physical images are combined.

The virtual director's viewfinder 100 can be used to control and/or interact with a virtual space generated by a computer system. In some implementations, the virtual space is implemented to create special effects and/or other animation features for a motion picture. For example, the virtual space can be used to provide virtual image content that is to be composited with one or more pictures captured from a physical scene, such as a movie set.

The virtual director's viewfinder 100 includes a housing 120 with a form factor of a director's viewfinder. The virtual director's viewfinder 100 includes at least one mechanical viewfinder control 110 connected to the housing. The virtual director's viewfinder encodes a setting of the mechanical viewfinder control into digital setting information. In some implementations, the mechanical viewfinder control 110 one or more mechanical rings. For example, the ring can an aperture ring, a zoom ring, or an aspect ratio ring.

In some implementations, the virtual director's viewfinder 100 includes optics 130 comprising at least one lens. The optics 130 is mounted to the housing for capturing a physical-scene image, for example of a movie set.

Any suitable technology can be used for the mechanical viewfinder control 110. In some implementations, the control 110 includes a physical component movable in at least one degree of freedom with regard to the housing 120. For example, a mechanical ring can be connected to the housing so that the ring can be selectively rotated at least partly around a cylindrical portion of the housing. As another example, a mechanical control can be connected to the housing so that a ring, knob or lever can selectively be slid or otherwise repositioned along the housing. As yet another example, a control can include a socket or other fitting for selectively receiving a plug or a matching connector.

Combinations of control types can be used. For example, a ring that both rotates and slides can be used. As another example, the housing can include a track or a groove where the user can selectively add a slider, wherein the control registers the position of the slider when present.

The location, movement, force and/or orientation represented by the mechanical viewfinder control(s) can be encoded in one or more ways. For some controls, the encoding generates one or more continuous setting values. In some implementations, a mechanical control can have a degree of freedom that involves a practically speaking endless number of settings in a range from A to B, where the range corresponds to the control's position, speed, acceleration and/or angle. For example, a zoom control can be variable essentially continuously between a maximal zoom value and a minimal zoom value. The setting(s) can then be encoded into one or more corresponding continuous setting values, such as a decimal or floating-point value reflecting the setting.

For some controls, the encoding generates one or more discrete setting values. For example, a setting such as aspect ratio can have multiple predefined values to choose between. In some implementations, the current setting of a mechanical control is encoded into one or more of the predefined values. In the control, the states corresponding to the respective discrete values can be created using any suitable technology including, but not limited to, detents that regulate the position, speed, acceleration and/or angle of the control.

FIG. 2 shows an example of a system 200 including the virtual director's viewfinder 100. The virtual director's viewfinder 100 is configured for communication with a computer system 210 using any suitable form of communication, including, but not limited to, a local area network communication (LAN), a wireless LAN connection, a Bluetooth connection, an optical digital connection, an infrared connection, and combinations thereof. The communication can be established using at least one network.

The virtual director's viewfinder 100 here includes at least one communication device 220. In some implementations, the communication device 220 facilitates communication of digital setting information to the computer system 210. For example, the virtual director's viewfinder 100 can generate aperture, zoom and/or aspect ratio information based on the setting(s) of the mechanical viewfinder control(s) 110 and forward such information to the computer system 210. The computer system 210 includes a communication device that is compatible with the communication device 220, for example a device of the same type. In some implementations, the communication device 220 communicates using USB or another suitable form of data connection.

The virtual director's viewfinder 100 here includes a display device 230. In some implementations, the display device 230 presents one or more images from the computer system 210. For example, the computer system 210 can generate the image(s) based in part on the setting information received from the virtual director's viewfinder 100. Then, the computer system 210 can forward the generated image(s) to the virtual director's viewfinder for presentation on the display device 230. Any suitable type of display device can be used, including, but not limited to, an LCD display. For example, a sufficiently small LCD display can be mounted on the housing where the lens glass would be on a traditional director's viewfinder.

In some implementations, the mechanical viewfinder control 110 comprises an aperture ring, the setting indicates an aperture size, and the digital setting information comprises digital aperture size information corresponding to the aperture size. For example, the computer system 210 can then generate the image(s) according to such digital aperture size information.

In some implementations, the mechanical viewfinder control 110 comprises a zoom ring, the setting indicates a focal length, and the digital setting information comprises digital focal length information corresponding to the focal length. For example, the computer system 210 can then generate the image(s) according to such digital focal length information.

In some implementations, the mechanical viewfinder control 110 comprises an aspect ratio ring, the setting indicates an aspect ratio, and the digital setting information comprises digital aspect ratio information corresponding to the aspect ratio. For example, the computer system 210 can then generate the image(s) according to such digital aspect ratio information.

In some implementations, the virtual director's viewfinder 100 includes an electronic light sensor 240 mounted to the housing. For example, the electronic light sensor 240 can register a physical-scene image. Any suitable type of electronic light sensor can be used, including, but not limited to a charge-coupled device such as those used in digital electronic cameras. The electronic light sensor 240 is mounted so that it can detect the image after it is captured by the optics 130 (FIG. 1). In some implementations, the virtual director's viewfinder 100 forwards the captured image(s) to the computer system 210 using the communication device 220. For example, the computer system 210 can process the received image, such as for adding special effects to it, and can store one or more images 250 as a result. In some implementations, the images 250 form a video sequence that the computer system can output, for example so that it is presented on the display device 230.

In some implementations, the virtual director's viewfinder 100 can include another input control 140 (FIG. 1) configured for a user to cause the communication device to instruct the computer system to record a snapshot of at least one image presented on the display device 230. The snapshot is recorded based on the user activating the control when the image is being presented. For example, the user can view a video sequence output from the computer system 210 and can create one or more snapshot images from the video sequence by activating the control 140. The control can be implemented using any technique suitable for the user to make an input including, but not limited to, a mechanical control mounted on the housing, and a virtual control activated by making a logical input.

The computer system 210 can generate a virtual space 260. In some implementations, the virtual space 260 includes a computer-generated three-dimensional space in which one or more characters or visual effects is generated. For example, the virtual space 260 can be defined to represent approximately the same dimensions as a movie stage or other physical set. The virtual space can have a perspective that matches a physical scene where one or more images are captured, for example a movie set. For example, the perspective matches the physical scene when the amount of foreshortening in a virtual-space image corresponds to the foreshortening that is observed (e.g., by the virtual director's viewfinder) in the physical space.

Special effects for the physical-set footage can then be defined in the virtual world, and the special effects can be combined with the image(s) of the physical scene to create a composited image or images. Any suitable technology can be used for defining the virtual space 260, such as visual objects stored in a repository, and executable instructions for processing the objects to generate content in one or more spatial dimensions. For creating video sequences, time-dependent special effects can be generated so that the object appearance varies over time. For example, a video view of the virtual space can be received from the computer device using the communication device 220, such as a video input connection. As another example, a separate communication device can be used to receive images from the computer system 210.

The computer system 210 uses setting information received from the virtual director's viewfinder to generate one or more images from the virtual space 260. For example, the computer system 210 can execute software that translates received information (e.g., USB signals) into a format for controlling the virtual space, such as coordinate values for a virtual camera that generates images from the virtual space.

A tracking device 270 can be provided for the virtual director's viewfinder 100. This tracking device 270 can be incorporated in the viewfinder, for example in form of an internal GPS and/or tilt or motion sensing device. As another example, this technology can be external to the device. For example, any suitable external tracking devices can be used.

Capturing the viewfinder's motion can give information about any of multiple degrees of freedom per frame. For example, six degrees of freedom can include three spatial dimensions (e.g., for x- y- and z-dimensions) and three rotational dimensions (i.e., tilt, pan and roll). The obtained information can be used to match the real space (e.g., as viewed through the optics 130 in FIG. 1) to the virtual space 260. For example, the tracking system is used to match the real and virtual worlds so that the 3D render from the virtual space 260 aligns with the real world as seen in the viewfinder. As another example, the tracking system is used so that the 3D world moves correctly when the viewfinder is moved, to name just two examples.

In some implementations, an external tracking system can track the viewfinder, such as using optical or audio signals. For example, motion capture markers can be mounted on the viewfinder for detection by an external system, such as the computer system 210. Such motion capture markers can include light-colored marker spheres mounted on rods. Rods of motion capture markers can extend in each of three spatial dimensions, for tracking the viewfinder's 3D movement. In some implementations, rods of different lengths can be used. For example, longer rods can facilitate better perception of 3D movement when the viewfinder is further away from an external tracking system.

Other tracking techniques can be used. In some implementations, the tracking device 270 can include an accelerometer or any other suitable sensor. Based on a calibrated starting position (e.g., the origin in an arbitrary coordinate system), the accelerometer(s) can detect the viewfinder's movement and from this its location, orientation and/or velocity can be determined. As other example, magnetic or audio sensors can be used to detect the position and/or movement of the viewfinder. As yet another example, the tracking device 270 can include an optical detector (e.g., a camera) mounted on, or integrated in, the viewfinder to capture its motion. The signals from any such tracking devices or sensors can be processed, either on the viewfinder 100 using a suitable algorithm, or in the computer system 210, and the resulting information can be used to generate the instructions for controlling the virtual space 260.

The captured motion can be used to control the operation, location and/or movement of virtual cameras. For example, the user navigates around in the virtual scene by moving the viewfinder, and the real time live output of the virtual camera can be seen on the display device 230.

FIG. 3 schematically shows an example of a mechanical viewfinder control 300. In some implementations, the mechanical viewfinder control 300 can be used in the viewfinder 100 (FIG. 1) and/or in the system 200 (FIG. 2). Here, the mechanical viewfinder control 300 includes at least one mechanical control 310. In some implementations, the mechanical control 310 includes at least one mechanical ring. For example, the ring can be mounted for selective rotation by a user around all or part of the housing of a virtual director's viewfinder. As another example, the mechanical ring can be mounted on the housing in a way that allows a user to slide the ring axially between two or more settings, including discrete or continuous setting values. The mechanical ring can include one or more of: an aperture ring, a zoom ring, and an aspect ratio ring, to name a few examples.

A mechanical control other than a ring can be used instead of, or in addition to, the mechanical ring. Some implementations can use one or more mechanical controls selected from a slider, a knob, a pushbutton, a switch, a selector, a screw, a pressure sensor, a handle or a lever, and combinations thereof. For example, the mechanical control 310 can include a slider that is configured to assume multiple discrete or continuous states.

In some implementations, the mechanical control 310 includes a socket or another connection fitting. For example, the virtual director's viewfinder can be configured to detect use of a wide angle attachment. The wide angle attachment can be selectively attached to, and removed from, the virtual director's viewfinder to indicate that an extended range of wide angle readings is available. The attachment can involve any suitable technique including, but not limited to, a bayonet fitting, a friction fit, a threaded fit, to name just a few examples. The control can be configured so that it detects the presence or absence of the wide angle attachment and adjusts the settings value(s) accordingly. When different wide angle attachments are available, the attachment can be coded with an identifier or other characteristic detectable by the mechanical control 310, so that the virtual director's viewfinder can generate the correct settings value(s).

In implementations where the virtual director's viewfinder can operate also in a physical mode (e.g., those that include the optics 130 (FIG. 1)), the component that connects with, or is otherwise detected by, the socket or other connection fitting, can be an optically functioning component (e.g., a color filter or a wide angle attachment). In other implementations that lack a physical mode (i.e., those not having a lens), the component whose presence or absence the control detects can be a dummy component. For example, the dummy component can be made to resemble the real component.

The mechanical control 300 includes at least one encoder 320 for encoding a setting of the mechanical control 310. In some implementations, the encoder 320 can read or otherwise detect a physical setting of a ring and convert the setting into corresponding digital information. The setting can reflect a present location or orientation of some portion of the ring, a present velocity of at least part of the ring, or a present acceleration of at least part of the ring, to name just a few examples. The encoder 320 encodes the setting into digital setting information. For example, the digital setting information can include one or more values or other parameters representing a location, an orientation, a velocity or an acceleration.

The mechanical control 300 includes a communication component 330 for forwarding the digital setting information to the computer device. In some implementations, the communication component 330 includes an interface or other logical connection that lets the encoder 320 forward the digital setting information to the communication device 220 (FIG. 2). For example, the communication component 330 can convert an output from the encoder 320 to a format used by the computer system 210 (FIG. 2) when generating images from the virtual space 260. Upon being forwarded to the computer system, the digital setting information is used in generating one or more images which can be provided to the virtual director's viewfinder.

FIG. 4 shows an example of components 400 in a virtual director's viewfinder. In some implementations, the virtual director's viewfinder can operate in each of multiple modes. Such modes can include at least a virtual mode and a physical mode. In the virtual mode, the display device presents an image generated by, and received from, the computer system. In the physical mode, the display device presents the physical-scene image captured by the virtual director's viewfinder.

Each of the components 400 can be mounted within, or on, or in association with the housing of the virtual director's viewfinder. The components 400 can include the optics 130 (FIG. 1), for example one or more lenses. The optics 130 captures an image of a physical scene. The components 400 can include a processing component 420 that receives images or other information originating in the virtual space 260 (e.g., the image/information is received from the computer system).

The optics 130 passes light for receipt by a charge-coupled device (CCD) 410 or other light sensor included in the virtual director's viewfinder. The CCD 410 generates image information corresponding to the received light. The CCD 410 forwards the image information for presentation on an LCD 430 mounted on the virtual director's viewfinder.

In the physical mode, the LCD 430 shows the image received from the CCD 410. Similarly, the processing component 420 forwards the received image/information for presentation on the LCD 430. In the virtual mode, the LCD 430 shows the image received from the processing component 420. The user can toggle between the physical and virtual modes, for example using a mechanical control on the virtual director's viewfinder, or by making a suitable logical input using an input control.

In some implementations, the virtual director's viewfinder can in the physical mode instead, or additionally, forward a video sequence of images to the computer system 210. For example, this can form a "video tap" from the virtual director's viewfinder for capturing the real-world view through the optics and optionally compositing it with the view of the virtual set. Such a composite can be sent back to the virtual director's viewfinder for presentation on the display device.

In some implementations, the virtual director's viewfinder forwards the physical-scene image to the computer device, and the computer device adds virtual-space content to the physical-scene image to generate an image for presentation on the virtual director's viewfinder.

In some implementations, instructions are stored in a computer-readable storage device, for example in the computer system 210 (FIG. 2). The instructions can be executed to perform operations relating to a virtual director's viewfinder. For example, the operations can include at least the following.

A setting of a mechanical viewfinder control on a virtual director's viewfinder can be encoded into digital setting information. For example, the encoder 320 can encode the position of a mechanical ring on the virtual director's viewfinder 100.

The digital setting information can be forwarded from the virtual director's viewfinder to a computer system having defined therein a virtual space. For example, the digital setting information can be forwarded by the communication device 220 to the computer system 210.

An image of the virtual space can be received. The image is generated by the computer system using the digital setting information, for display at the virtual director's viewfinder. For example, the virtual director's viewfinder 100 can receive a composite image from the computer system 210.

A user input can be received, by another control at the virtual director's viewfinder, when the image is being presented. For example, the user can activate the control 140.

The computer system can be instructed, in response to the user input, to record a snapshot of at least the image. For example, the user of the virtual director's viewfinder 100 can make the input to capture a snapshot of the video sequence received from the computer system 210.

A physical-scene image can be captured in the virtual director's viewfinder using an electronic light sensor and optics comprising at least one lens. For example, the electronic light sensor 240 and the optics 130 can be used.

The physical-scene image can be forwarded to the computer system, wherein the image is generated by the computer system adding virtual-space content to the physical-scene image. For example, the computer system 210 can add virtual-space visual effects to the captured image.

Figure 5:
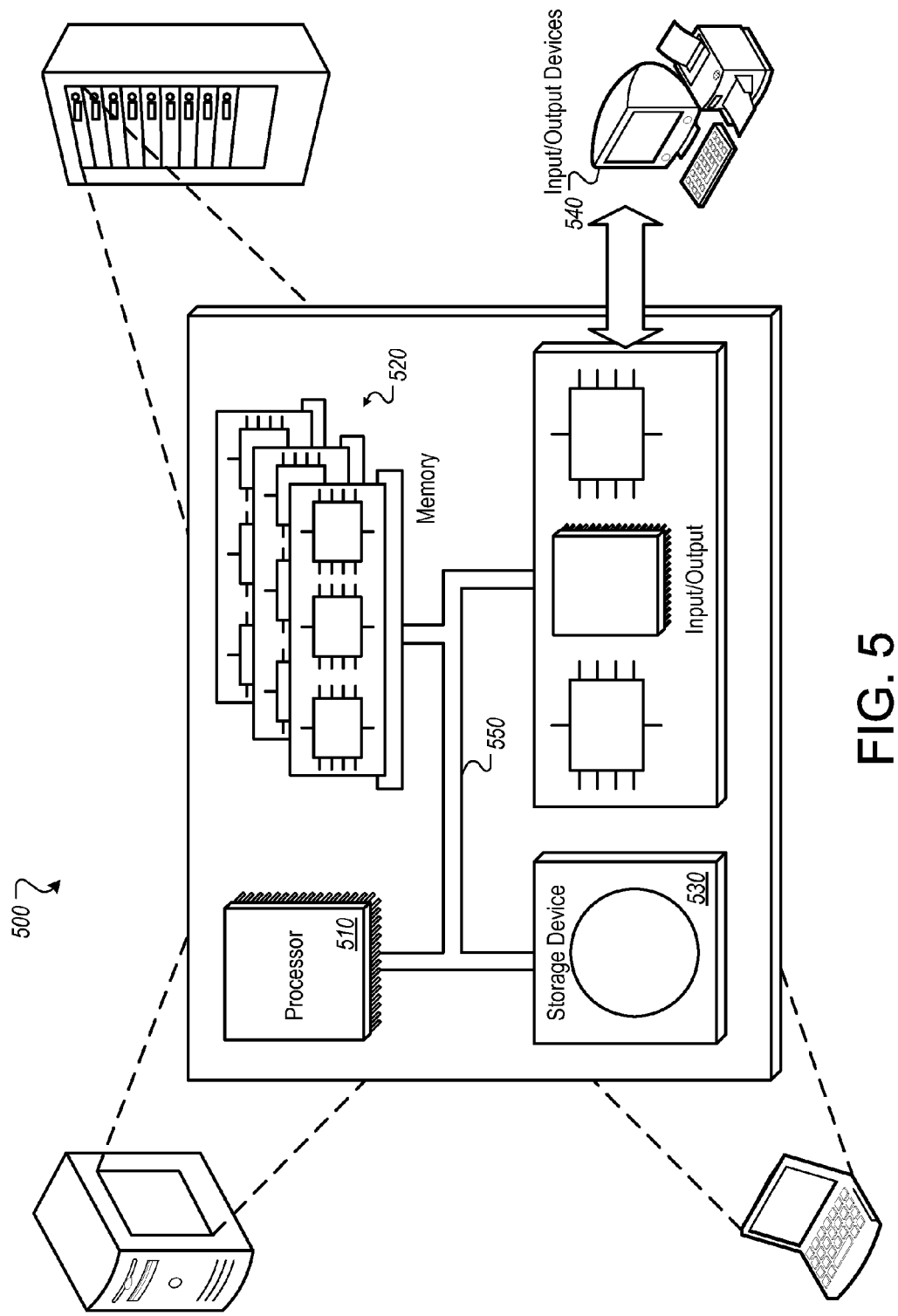
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A virtual director's viewfinder comprising:
   a housing;
   at least one mechanical viewfinder control connected to the housing;
   at least one communication device;
   a display device;
   a processor; and
   one or more memory devices comprising instructions which, when executed by the one or more processors, cause the processor to perform operations including:
      digitizing a setting of the at least one mechanical viewfinder control;
      sending the digitized setting of the at least one mechanical viewfinder control to an external computer system through the communication device;
      receiving an image from the external computer system through the communication device, wherein the digital setting information is used by the external computer system to generate the image; and
      displaying the image on the display device.

2. The virtual director's viewfinder of claim 1, wherein the at least one mechanical viewfinder control comprises an aperture ring, the setting indicates an aperture size, the digitized setting comprises digital aperture size information corresponding to the aperture size, and wherein the image is generated according to the digital aperture size information.

3. The virtual director's viewfinder of claim 1, wherein the at least one mechanical viewfinder control comprises a zoom ring, the setting indicates a focal length, the digitized setting comprises digital focal length information corresponding to the focal length, and wherein the image is generated according to the digital focal length information.

4. The virtual director's viewfinder of claim 1, wherein the at least one mechanical viewfinder control comprises an aspect ratio ring, the setting indicates an aspect ratio, the digitized setting comprises digital aspect ratio information corresponding to the aspect ratio, and wherein the image is generated according to the digital aspect ratio information.

5. The virtual director's viewfinder of claim 1, further comprising:
   optics mounted to the housing, the optics comprising at least one lens; and
   an electronic light sensor mounted to the housing, wherein the instructions cause the one or more processors to perform additional operations including:
      receiving a physical-scene image captured through the optics and registered by the electronic light sensor.

6. The virtual director's viewfinder of claim 5, configured to operate in each of multiple modes including at least:
   a virtual mode where the display device presents the image; and
   a physical mode where the display device presents the physical-scene image.

7. The virtual director's viewfinder of claim 6, further comprising a tracking device, wherein the instructions cause the one or more processors to perform additional operations including:
   receiving signals from the tracking device;
   determining a location of the virtual director's viewfinder based on the signals; and
   sending the location of the virtual director's viewfinder to the external computer system through the communication device, wherein the location is used by the external computer system to generate the image.

8. The virtual director's viewfinder of claim 5, wherein the instructions cause the one or more processors to perform additional operations including:
   sending the physical-scene image to the external computer system through the communication device, wherein:
      the image is further generated by the external computer system by rendering virtual-space content with elements of the physical-scene image to generate a composite scene image; and
      the image is displayed on the display device in real time as the physical-scene image is captured by the optics.

9. The virtual director's viewfinder of claim 1, wherein the image is included in a video sequence output by the computer system and presented on the display device.

10. The virtual director's viewfinder of claim 1, wherein the display device presents the image, the virtual director's viewfinder further comprising:
   another control configured for a user to cause the communication device to instruct the computer system to record a snapshot of at least the image, based on the user activating the control when the image is being presented.

11. A method comprising:
   using a virtual director's viewfinder that comprises a housing, at least one mechanical viewfinder control connected to the housing, at least one communication device, a display device, a processor; and one or more memory devices;
   digitizing a setting of the mechanical viewfinder control on the virtual director's viewfinder;
   sending the digitized setting of the at least one mechanical viewfinder control to an external computer system through the communication device;
   receiving, at the virtual director's viewfinder, a rendered image of the virtual space generated by the external computer system using the digitized setting of the at least one mechanical viewfinder control; and displaying, at the virtual director's viewfinder, the rendered image in real time.

12. The computer-implemented method of claim 11, further comprising:
  receiving user input by another control at the virtual director's viewfinder when the rendered image is being presented; and
  instructing the external computer system, in response to the user input, to record a snapshot of at least the rendered image.

13. The computer-implemented method of claim 11, further comprising:
  capturing a physical-scene image in the virtual director's viewfinder using an electronic light sensor and optics comprising at least one lens.

14. The computer-implemented method of claim 13, further comprising:
  forwarding the physical-scene image to the computer system, wherein the rendered image is generated by the external computer system by rendering the virtual-space content with elements of the physical-scene image.

\* \* \* \* \*